(12) United States Patent
Aemisegger et al.

(10) Patent No.: US 9,033,072 B2
(45) Date of Patent: May 19, 2015

(54) TRAILER MANEUVERING DRIVE

(71) Applicant: TRUMA GERATETECHNIK GMBH & CO. KG, Putzbrunn (DE)

(72) Inventors: Steve Aemisegger, Munich (DE); Daniel Gumpp, Weil (DE); Jochen Mueller, Moosach (DE); Tobias Schmid, Erding (DE); Klaus Muessler, Egenburg (DE); Ana Maria Fernandez, Munich (DE); Joerg Mueller, Egmating (DE); Oliver Schaurer, Oberding (DE); Mario Moehring, Gammelsdorf (DE); Mathias Venschott, Munich (DE)

(73) Assignee: TRUMA GERÄTETECHNIK GMBH & CO. KG, Putzbrunn (DE)

( * ) Notice: Subject to any disclaimer, the term of this patent is extended or adjusted under 35 U.S.C. 154(b) by 41 days.

(21) Appl. No.: 13/904,075

(22) Filed: May 29, 2013

(65) Prior Publication Data

US 2013/0337970 A1  Dec. 19, 2013

(30) Foreign Application Priority Data

May 29, 2012 (DE) .......................... 10 2012 010 540

(51) Int. Cl.
*F16H 13/02* (2006.01)
*B62D 59/04* (2006.01)

(52) U.S. Cl.
CPC ................ *F16H 13/02* (2013.01); *B62D 59/04* (2013.01)

(58) Field of Classification Search
CPC ................................ B62D 59/04; F16H 13/02
USPC ......................................... 180/16, 341, 206.8
See application file for complete search history.

(56) References Cited

U.S. PATENT DOCUMENTS

| RE39,179 | E   * | 7/2006  | Naunheimer et al. ............ 475/5 |
| 7,243,747 | B2 * | 7/2007  | Bender et al. .................... 180/15 |
| 7,766,387 | B1 * | 8/2010  | Rosenbalm et al. .......... 280/757 |
| 8,353,375 | B2 * | 1/2013  | James ........................ 180/65.51 |
| 2005/0189155 | A1 * | 9/2005 | Bender et al. .................... 180/15 |
| 2014/0114521 | A1 * | 4/2014 | Aemisegger et al. ........... 701/22 |

FOREIGN PATENT DOCUMENTS

| DE | 20 2005 006 693 U1 | 9/2005  |
| DE | 20 2005 015 876 U1 | 2/2006  |
| DE | 20 2009 001 675 U1 | 12/2009 |
| DE | 20 2010 008 600 U1 | 2/2012  |
| EP | 1714858 A1         | 10/2006 |
| EP | 2208661 A1         | 1/2009  |

* cited by examiner

*Primary Examiner* — Kevin Hurley
(74) *Attorney, Agent, or Firm* — McNees Wallace & Nurick LLC

(57) ABSTRACT

A maneuvering drive for a trailer includes a fastening device, a carrier, a drive motor as well as a drive roller. The fastening device is provided for fastening the maneuvering drive to the trailer. The carrier is movable relative to the fastening device and holds the drive motor. The drive roller is rotatably drivable by the drive motor which is a brushless electric motor with an external rotor.

15 Claims, 3 Drawing Sheets

TRAILER MANEUVERING DRIVE

TECHNICAL FIELD

This invention relates to a maneuvering drive for a trailer, in particular for caravans, boat trailers, horse trailers, market trailers, goods trailers and the like.

BACKGROUND OF THE INVENTION

Trailers usually are towed by tractors. It is known, for example, that a passenger car can tow a caravan. When the trailer is removed from the tractor, it mostly is pushed into the final position by hand. Nowadays, however, there are more and more offered trailers in the caravan sector, which due to their size and hence their weight only can be shifted by hand with great effort. Therefore, maneuvering or auxiliary drives have been developed, which provide for shifting or turning a trailer even without tractor with the aid of a motor.

EP 1 714 858 A1 describes a maneuvering drive for a vehicle trailer with an unilaterally supported drive roller. The maneuvering drive includes a carrier movable relative to a chassis of the trailer, which carries a drive motor and a drive roller. A moving mechanism serves for moving the carrier between a rest position, in which the drive roller is separated from a wheel of the trailer, and a drive position in which the drive roller is pressed against the wheel of the trailer. The drive motor drives the drive roller via a transmission.

DE 20 2005 006 693 U1 describes a control means for the pulse-width-modulated actuation of such drive motor.

From EP 2 208 661 A1 a maneuvering drive is known, in which both the drive motor and the transmission are arranged inside the drive roller. The drive motor can be a brushless electric motor.

Although EP 2 208 661 A1 proposes the use of a brushless electric motor for the drive motor, this is with the aim to arrange the motor largely in the interior of the drive roller, which requires a high constructive and constructional effort.

BRIEF SUMMARY OF THE INVENTION

It is the object of the present invention to provide a maneuvering drive for a trailer which has an improved motor concept.

This is achieved by a maneuvering drive for a trailer comprising a fastening element, a carrier, a drive motor as well as a drive roller. The fastening device is provided for fastening the maneuvering drive to the trailer. The carrier is movable relative to the fastening device and holds the drive motor. The drive roller is rotatably drivable by the drive motor which is a brushless electric motor with an external rotor.

In one variant a moving means is provided for moving the carrier between a rest position, in which the drive roller is separated from a wheel of the trailer, and a drive position in which the drive roller is pressed against the wheel of the trailer.

The maneuvering drive typically includes the carrier movable relative to the fastening device which carries the drive motor and the drive roller. By means of the moving means, the carrier can be reciprocated between the rest position and the drive position so that the drive roller is pressed against the wheel of the trailer, e.g. against the tread of the trailer wheel or is lifted off from the wheel, when necessary. This construction is known for example from EP 1 714 858 A1.

In the prior art, it is common practice that the drive motor is designed as a brushed motor, for example as universal motor. According to the invention, however, a brushless electric motor with external rotor (subsequently also referred to as external rotor motor) is proposed as drive motor.

An external rotor motor has the advantage that it produces a higher torque than an internal rotor motor. Due to the increased torque, the speed of the motor also can be reduced which has an advantageous effect for the design of a transmission required between the drive motor and the drive roller, in particular for the demands placed on the gear ratios.

Due to the construction of an external rotor motor, the construction volume and the weight also can noticeably be reduced, so that a higher power-to-weight ratio can be achieved. In addition, the external rotor motor is easier to cool than an internal rotor motor.

The brushless external rotor motor can include a three-phase or also multi-phase actuation. When the motor is operated in the low-voltage range for safety reasons (for example with a usual battery voltage such as 12 V, 24 V or 48 V), it is expedient when the motor is able to briefly absorb high currents (for example up to 90 A). A supply with direct voltage or alternating voltage is possible.

The drive motor can be arranged outside the drive roller. In this way, the drive roller can be designed relatively compact. Since the external rotor motor also only has a small overall size, the maneuvering drive as a whole can be constructed in a space-saving manner. This is advantageous in particular because the maneuvering drive typically is to be arranged on the bottom side of the trailer in the region of the wheelhouse in the vicinity of the trailer wheel to be driven. The installation space available there generally is limited.

In the flux of force between the drive motor and the drive roller a transmission device can be provided. This is expedient to reduce the speed of the external rotor motor and convert it into a suitable speed for the drive roller. The external rotor motor for a brushless electric motor mostly has a lower nominal speed in relation to internal rotor motors. However, this speed also is too high to be transmitted directly to the drive roller.

There can be provided a rotor information detection means for obtaining information on the position and/or the movement of the external rotor. By means of the rotor information detection means it is thus possible to detect the position or also the rotary movement or direction of rotation of the external rotor in the drive motor. With reference to the information thus obtained, the motor controller can specify the rotating field for the motor in a suitable way.

The rotor information detection means may include at least one or more Hall sensors, e.g. three Hall sensors, or an incremental disk or an incremental encoder. By means of the Hall sensors the position of the external rotor can be determined exactly, wherein information on the rotational speed and the direction of rotation can be obtained therefrom. The information on the rotational speed can be evaluated e.g. for the highly accurate actuation of the drive motor, when the motor speeds of a plurality of maneuvering drives arranged on a trailer are to be matched with each other, in order to achieve a desired total movement of the trailer.

The information from the rotor information detection means or the Hall sensors correspondingly can be supplied to a motor controller by means of which the drive motor can be operated precisely. Thus, it is possible to precisely adjust, keep constant or vary the respectively desired motor speeds.

When providing the rotor information detection means, e.g. with three Hall sensors, it is possible in particular to reliably start the drive motor, in particular under load, because the correct commutation for the motor already is present at the beginning. The Hall sensors can be arranged at the circumference of the internal stator e.g. at an angle of 30 or 60 degrees, wherein at the circumference of the external rotor a number of magnets, e.g. 12 or 14 magnets, then correspondingly are arranged uniformly distributed.

A recuperation device for feeding back energy can be provided when the drive roller is utilized for braking the wheel of the trailer. The recuperation device can include or utilize the drive motor which in this case is operable in a generator mode for feeding back energy. In this way, the recuperation device also can be used for regulating the velocity, e.g. during downhill driving of the trailer.

With a corresponding motor controller, the brushless motor correspondingly can be used for braking, i.e. decelerating the trailer in operation. Due to the generator mode of the motor, the energy to be absorbed by the motor during the braking operation can be fed back into an energy accumulator, for example into a battery present in the trailer. The total driving time (operating time) thereby can be prolonged on the one hand. On the other hand, there can also be used smaller batteries with lower capacitance.

Alternatively or in addition to the recuperation device a braking device can be provided which effects braking of the drive roller. The braking device hence can be utilized like the recuperation device for braking or regulating the velocity. In contrast to the recuperation device, however, the energy is not recovered in the braking device and stored in an energy accumulator, but merely converted into heat.

The braking device can include the possibility of operating the drive motor in the generator mode. For operating the drive motor in the generator mode, a winding short-circuit and/or an induction of an opposing field can be effected. By means of the winding short-circuit it is possible to achieve relatively hard braking. In the case of the winding short-circuit, however, no energy can be recovered. By the induction of the opposing field softer, more gentle braking can be effected, so that for example during downhill driving of the trailer the velocity can be regulated more easily. In particular, an excessive increase of the velocity can be counteracted in good time.

In one variant, the braking device in particular can serve as holding brake, so that it is not used for regulating the velocity but for blocking a rotary movement of the drive roller or the drive motor.

The braking device can be formed as mechanical braking device or as electromechanical braking device, e.g. as magnetic brake.

The braking device in particular can act directly on the drive motor, for example on the external rotor, and effect braking of the drive roller by decelerating the external rotor.

The braking device in addition is expedient to achieve blocking of the drive roller when the maneuvering drive is not operated. Maneuvering drives known from the prior art frequently include a transmission device between drive motor and drive roller which due to their efficiency effects self-locking. This means that during standstill of the drive motor the drive roller is blocked, i.e. no longer is able to rotate. When the efficiency of the transmission is increased, however, self-locking is not obtained so that an additional braking effect must be produced, which is possible by means of the braking device.

The braking device can be arranged on the end face of the drive motor. Alternatively or in addition, the braking device can be attached to the external rotor. Furthermore alternatively or in addition, the braking device can act directly on the motor shaft of the drive motor or be arranged on the motor shaft. In this way, the braking device can prevent the motor or external rotor from rotating which consequently also leads to blocking of the drive roller. When the braking device includes a magnetic brake the magnetic brake can act e.g. directly on the motor shaft of the external rotor motor.

The braking device and the drive motor can be covered by a common cover. It likewise is possible that the braking device is accommodated directly in the motor housing. This saves housing parts, costs and construction volume. Likewise, the braking device also can be mounted directly on the motor housing in order to provide for a direct effect of the braking device on the drive motor or the motor shaft.

An electronic control unit for the drive motor can be arranged on the end face and/or laterally of the drive motor. It hence is possible that the electronic control unit is structurally provided very close to the drive motor. This results in short line paths, a reduced assembly effort and low demands on the installation space.

The drive motor can include a bearing plate on its end face. Alternatively or in addition, the control electronics can be arranged on the bearing plate. It is also possible that the drive motor is attached to a bearing plate on the end face. By means of the bearing plate it is possible to comfortably preassemble the drive motor and possibly the control electronics before the entire unit then is mounted in the maneuvering drive.

The drive motor can include an internal stator wherein the external rotor surrounds the internal stator in a bell-shaped manner. The external rotor may include a cooling fan wheel, i.e. the cooling fan wheel is integrated directly into the bell of the external rotor.

In modern maneuvering drives attention increasingly is paid to the fact that they have a visually appealing design which in particular leads to the fact that the technical function carriers are covered by correspondingly designed trim panels. Especially with longer maneuvering operations with the maneuvering drive, however, an effective motor cooling is necessary. When utilizing the external rotor motor, the cooling fan wheel can be integrated into the external rotor or into the bell of the external rotor so that a separate blower or fan wheel need not be attached to the motor shaft.

The internal stator can be integrated to form a constructional unit with the bearing plate.

The internal stator can include a sleeve or hub surrounding the motor shaft which is integrally connected with the bearing plate.

In one variant the drive motor can include an upright internal stator, the external rotor can surround the internal stator in a bell-shaped manner, and the motor shaft can be attached to the external rotor and be guided through the interior of the internal stator. This provides for a particularly compact construction of the external rotor motor.

Depending on the construction of the maneuvering drive, the axis of rotation of the drive motor can extend parallel or vertically or at an oblique angle to the axis of rotation of the drive roller. Since the brushless external rotor motor has a very compact construction, it is suitable in principle for each of these arrangements.

A coupling could be provided between the motor and the transmission for vibration damping. The same usually contains a damping rubber element between the drive side and the driven side, whereby possible imbalances or alignment errors can be compensated and noise can be avoided.

DETAILED DESCRIPTION OF PREFERRED EMBODIMENTS

Figure 1:
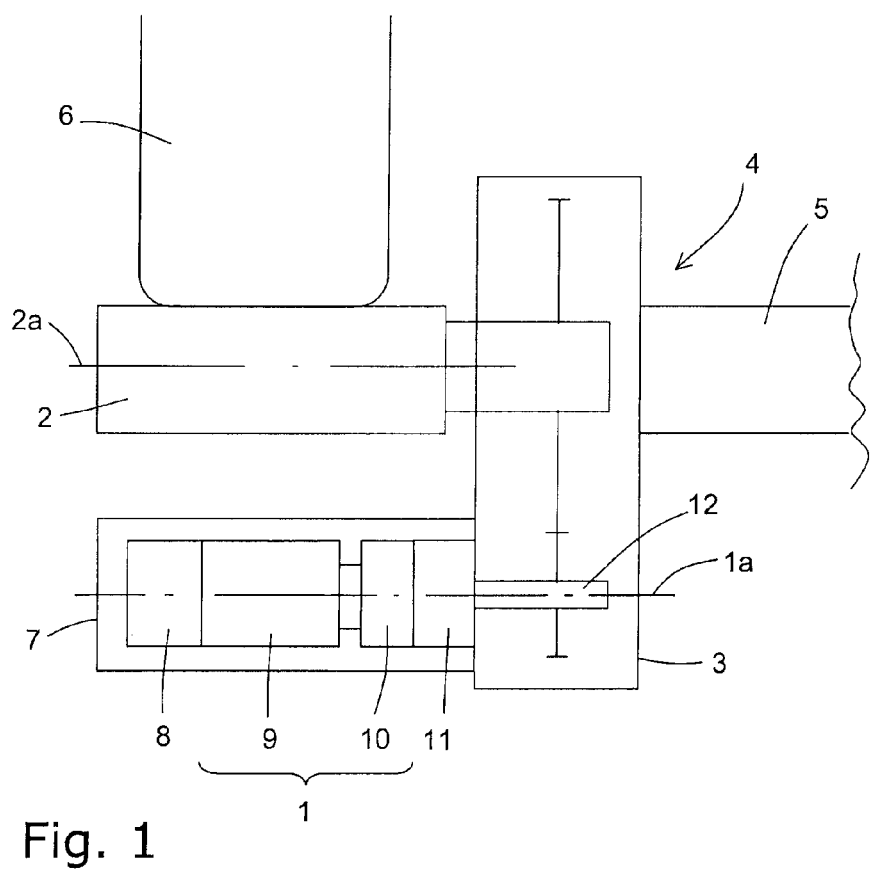
FIG. 1 shows a schematic top view with a partial sectional view of a maneuvering drive with parallel axes of rotation of drive motor and drive roller.

FIG. 1 shows a schematic top view of a maneuvering drive with a drive motor 1 arranged under a cover 7 and a drive roller 2 rotatably drivable by the drive motor 1.

The drive motor 1 and the drive roller 2 are held by a carrier 3. In the interior of the carrier 3 there is also arranged a transmission device 4 which serves to convert the relatively high speed of the drive motor 1 into a lower speed for the drive roller 2. In FIG. 1, the transmission device 4 only is shown schematically. In particular, the transmission device 4 can include several steps in order to achieve the desired total gear ratio. The carrier 3 is held by a fastening device 5 which in turn can be mounted on a non-illustrated chassis of a trailer. For example, the fastening device 5 can be designed in the form of a square tube which can be pushed onto a corresponding transverse tube (not shown) wherein the transverse tube in turn is attached to the bottom side of the trailer.

The carrier 3 is linearly reciprocable relative to the fastening device 5 by means of a moving means 30. In this way, the carrier 3 can reciprocated between a rest position in which the drive roller 2 is separated from a wheel 6 of the trailer and a drive position in which the drive roller 2 is pressed against the wheel 6 of the trailer, as shown in FIG. 1.

This construction of such maneuvering drive is known in principle.

According to the invention, a brushless electric motor with external rotor is used as drive motor 1. The drive motor 1 is arranged in a motor housing 7. On the end face, namely on the rear end face of the drive motor 1 a braking means 8 is provided which is employed in particular during standstill of the drive motor 1 and should prevent an inadvertent rotation of the drive roller 2.

The braking device 8 is arranged on the end face of an external rotor 9 of the drive motor 1 and acts directly on the motor shaft serving as drive shaft 12. The external rotor 9 surrounds an internal stator 10 in a bell-shaped manner, of which internal stator FIG. 1 only shows the part protruding out of the external rotor 9. The internal stator 10 in turn is attached to a bearing plate 11 so that the bearing plate 11 supports both the drive motor 1 and the braking device 8 held by the drive motor 1.

The bearing plate 11 also can be integrated into the internal stator 10 or be formed integrally with the internal stator 10. In this case, the part of the internal stator 10 guided out of the external rotor 9 is formed as end shield which serves as bearing plate.

In or at the bearing plate 11, a non-illustrated electronic motor controller or components of the control electronics can also be mounted. The bearing plate 11 in turn is attached to the carrier 3. In particular, the bearing plate 11 can directly be flange-mounted to the transmission housing of the transmission device 4.

Of course, it is also possible to mount the drive motor 1 directly on the carrier 3 by means of its end shield connected with the internal stator 10, without interposition of a separate bearing plate 11.

The motor shaft or drive shaft 12 of the drive motor 1 protrudes into the interior of the transmission device 4 so that the rotary movement can be converted into a suitable movement for the drive roller 2 by the transmission device 4.

The axis of rotation 1a of the drive motor 1 and the axis of rotation 2a of the drive roller 2 are parallel to each other in the variant of FIG. 1.

Figure 2:
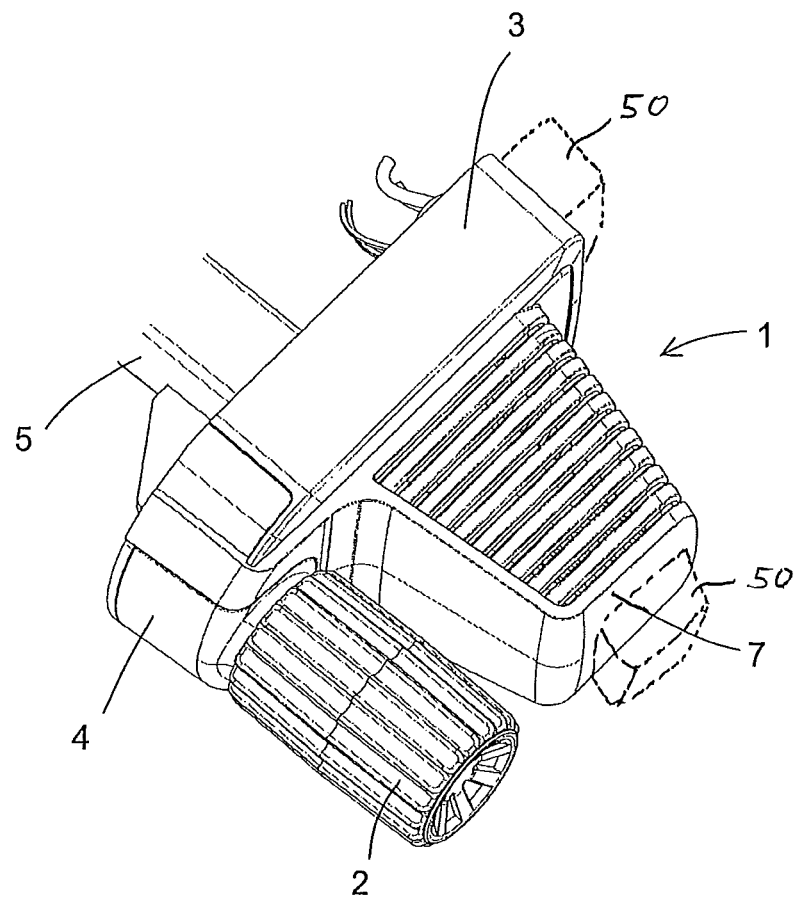
FIG. 2 shows an example for a perspective external view of a maneuvering drive according to FIG. 1.

FIG. 2 shows a perspective view of an example for a maneuvering drive according to FIG. 1.

Figure 3:
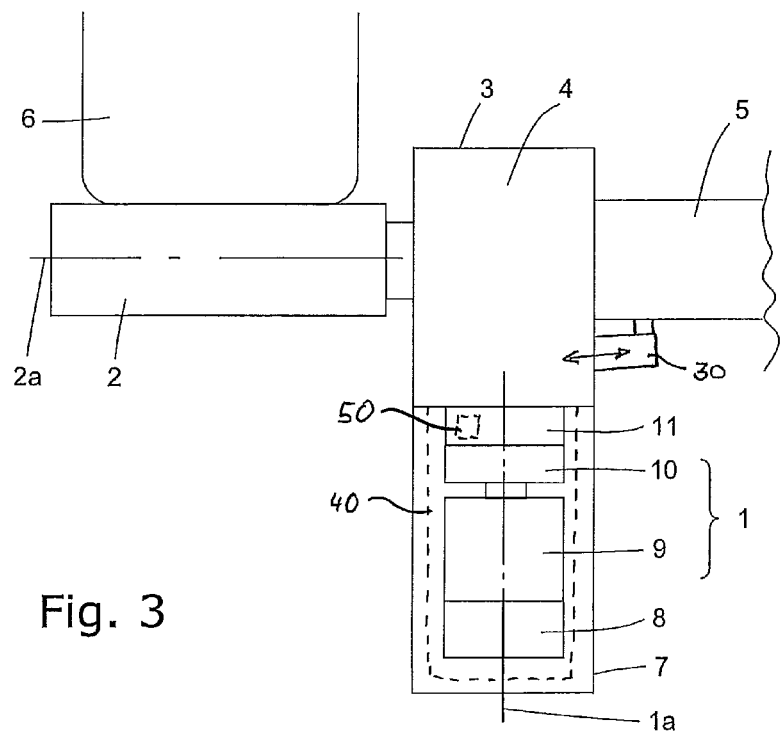
FIG. 3 shows a schematic top view of a maneuvering drive with axes of rotation of drive roller and drive motor extending at right angles to each other.

FIG. 3 shows another embodiment for a maneuvering drive in which the axis of rotation 1a of the drive motor 1 is vertical to the axis of rotation 2a of the drive roller 2. The further components of the maneuvering drive substantially are constructed identically so that a detailed description can be omitted.

The transmission device 4 merely must be designed such that it can convert the rotary movement of the drive motor 1 over the angle of 90°. For this purpose, for example bevel-gear drives or worm-gear drives can be used.

In the variant of FIG. 3 the drive motor 1 also is designed as brushless electric motor with external rotor 9.

Figure 4:
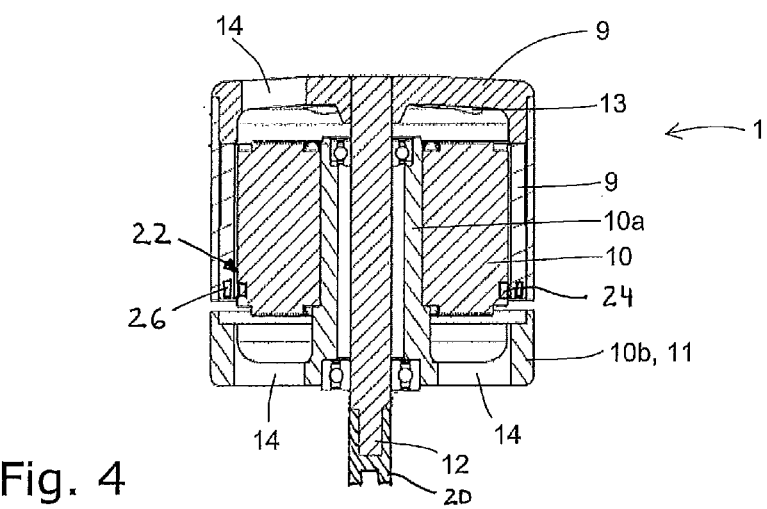
FIG. 4 shows a sectional representation of a brushless motor with external rotor.

An example for such external rotor motor is shown in FIG. 4.

The external rotor 9 encloses the upright internal stator 10 like a bell. The drive shaft 12 is attached to the external rotor 9 and is guided through the interior of the internal stator 10 or through a sleeve or hub 10a forming a part of the internal stator 10. Correspondingly, the external rotor 9 with the drive shaft 12 is mounted on the internal stator 10.

An end shield 10b, which serves as bearing plate 11, is integrally connected with the internal stator 10. The bearing plate 11 also can be formed as separate part (not shown in FIG. 4), so that the internal stator 10 can be fixed on the bearing plate 11.

In the end-face part of the external rotor 9, vanes of a cooling fan wheel 13 are integrated. Upon rotation of the external rotor 9, the vanes of the cooling fan wheel 13 generate an air stream which is utilized for cooling the drive motor 1. For a sufficient air supply, vent openings 14 are provided.

The braking device 8 of FIGS. 1 and 3 can be arranged on the end face of the external rotor 9 and can act directly on the drive shaft 12. For this purpose, the drive shaft 12 must be extended or protrude on the side of the external rotor 9 facing away from the end shield 10b, so that the braking torque can be introduced into the drive shaft 12.

The control electronics for the drive motor 1 can be arranged directly on the bearing plate 11 or the end shield 10b. For example, the components of the control electronics can be soldered onto a board which in turn is suitably fixed on or at the bearing plate 11 or the end shield 10b.

A coupling 20 is provided between the motor 1 and the transmission device 4 for vibration damping. This formation is independent of the exact arrangement of motor to transmission and thus relates to all embodiments. The coupling 20 is shown symbolically in FIG. 4.

The coupling 20 is interposed e.g. between the shaft 12 and the first gear wheel of the transmission and usually contains a damping rubber element between the drive side and the driven side, whereby possible imbalances or alignment errors can be compensated and noise can be avoided.

A rotor information detection means 22 for obtaining information on the position and/or the movement of the external rotor 9 can be provided. By means of the rotor information detection means 22 it is thus possible to detect the position or also the rotary movement or direction of rotation of the external rotor 9 in the drive motor 1. With reference to the information thus obtained the motor controller can specify the rotating field for the motor in a suitable way.

It may be advantageous when the rotor information detection means 22 includes at least one or more Hall sensors 24, e.g. three Hall sensors, or an incremental disk or an incremental encoder.

The Hall sensors 24 can be arranged at the circumference of the internal stator 10 e.g. at an angle of 30 or 60 degrees, wherein at the circumference of the external rotor 9 a number of magnets 26, e.g. 12 or 14 magnets, then correspondingly are arranged uniformly distributed.

As already mentioned above, there can be provided a recuperation device 40 for feeding back energy when the drive roller is utilized for braking the wheel of the trailer. The recuperation device 40 can include or utilize the drive motor 1 which in this case is operable in a generator mode for feeding back energy. In this way, the recuperation device 40 also can be used for regulating the velocity, e.g. during downhill driving of the trailer.

With a corresponding motor controller, the brushless motor correspondingly can be used for decelerating the trailer in operation. Due to the generator mode of the motor, the energy to be absorbed by the motor during the braking operation can be fed back into an energy accumulator, for example into a battery present in the trailer. The total driving time (operating time) thereby can be prolonged on the one hand. On the other hand, there can also be used smaller batteries with lower capacitance.

An electronic control unit 50 can be provided on the end face and/or laterally of the drive motor 1, see FIG. 2.

The invention claimed is:

1. A maneuvering drive for a trailer, comprising
a fastening device for fastening to the trailer;
a carrier movable relative to the fastening device;
a drive motor held by the carrier;
a rotor information detection device is provided for obtaining information on at least one of the position and the movement of the external rotor; and
a drive roller rotatably drivable by the drive motor; wherein the drive motor is a brushless electric motor with an external rotor.

2. The maneuvering drive according to claim 1, wherein the drive motor is arranged outside the drive roller.

3. The maneuvering drive according to claim 1, wherein a transmission device is provided in the flux of force between the drive motor and the drive roller.

4. The maneuvering drive according to claim 1, wherein the rotor information detection device includes at least one Hall sensor.

5. The maneuvering drive according to claim 1, wherein
a recuperation device is provided for feeding back energy when the drive roller is utilized for braking the wheel of the trailer; and wherein
the recuperation device includes the drive motor which is operable in a generator mode for feeding back energy.

6. The maneuvering drive according to claim 5, wherein for operating the drive motor in the generator mode at least one of a winding short-circuit and an induction of an opposing field can be effected.

7. The maneuvering drive according to claim 1, wherein at least one of a coupling for vibration damping and a braking device is provided between the motor and a transmission device.

8. The maneuvering drive according to claim 7, wherein the braking device is at least one of arranged on the end face of the drive motor attached to the external rotor and arranged directly on a motor shaft of the drive motor.

9. The maneuvering drive according to claim 1, wherein an electronic control unit for the drive motor is arranged on at least one of the end face and laterally of the drive motor.

10. The maneuvering drive according to claim 9, wherein the drive motor includes a bearing plate on its end face.

11. The maneuvering drive according to claim 1, wherein
the drive motor includes an internal stator;
the external rotor surrounds the internal stator in a bell-shaped manner; and
the external rotor includes a cooling fan wheel.

12. The maneuvering drive according to claim 11, wherein
the drive motor includes an upright internal stator;
the external rotor surrounds the internal stator in a bell-shaped manner; and
the motor shaft is attached to the external rotor and is guided through the interior of the internal stator.

13. The maneuvering drive according to claim 1, wherein the axis of rotation of the drive motor extends one of parallel, vertically and at an oblique angle to an axis of rotation of the drive roller.

14. The maneuvering drive according to claim 1, wherein a moving member is provided for moving the carrier between a rest position, in which the drive roller is separated from a wheel of the trailer, and a drive position in which the drive roller is pressed against the wheel of the trailer.

15. The maneuvering drive according to claim 10, wherein the electronic control unit is arranged on the bearing plate.

* * * * *